June 24, 1969  P. S. SENSEMAN  3,452,190
ILLUMINATING DEVICE FOR VEHICLES
Filed Dec. 27, 1965  Sheet 1 of 2
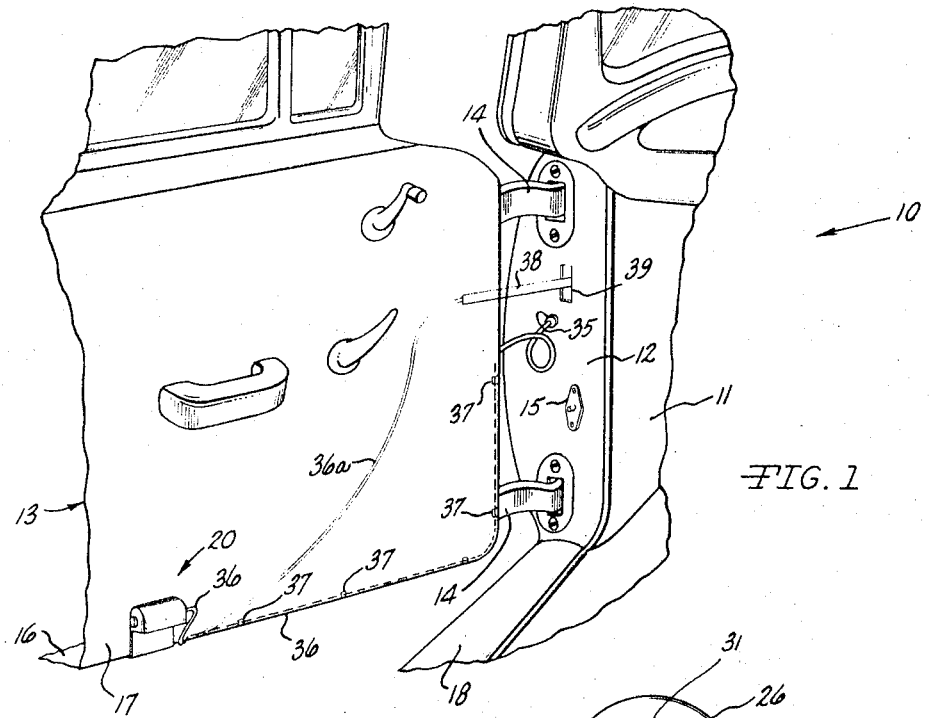
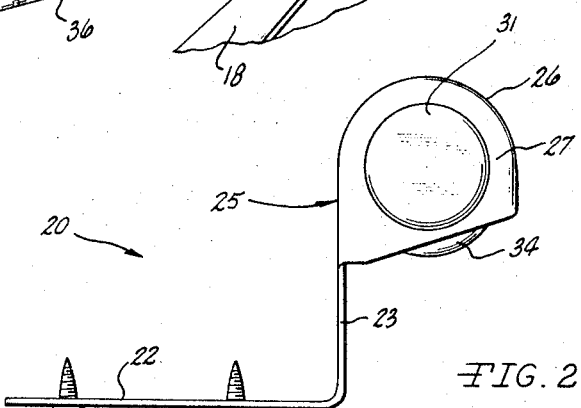
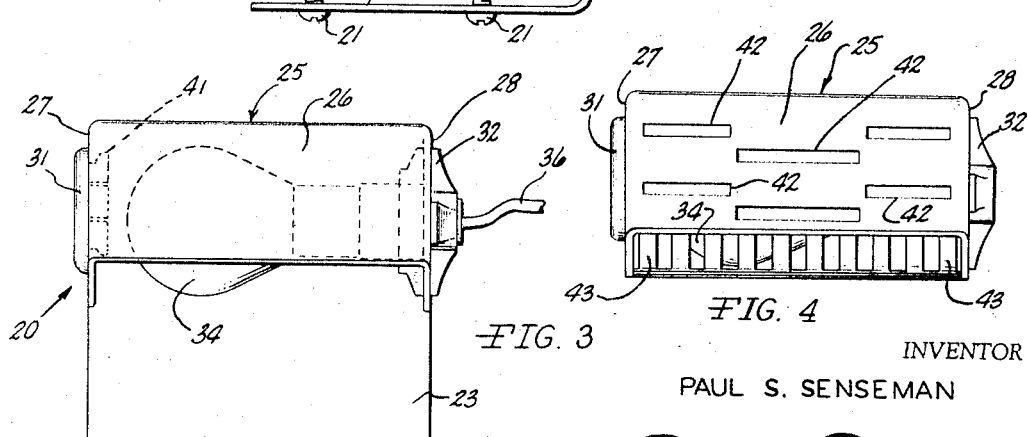
INVENTOR
PAUL S. SENSEMAN
BY Roy A. Plant
ATTORNEY June 24, 1969 P. S. SENSEMAN 3,452,190
ILLUMINATING DEVICE FOR VEHICLES
Filed Dec. 27, 1965 Sheet 2 of 2
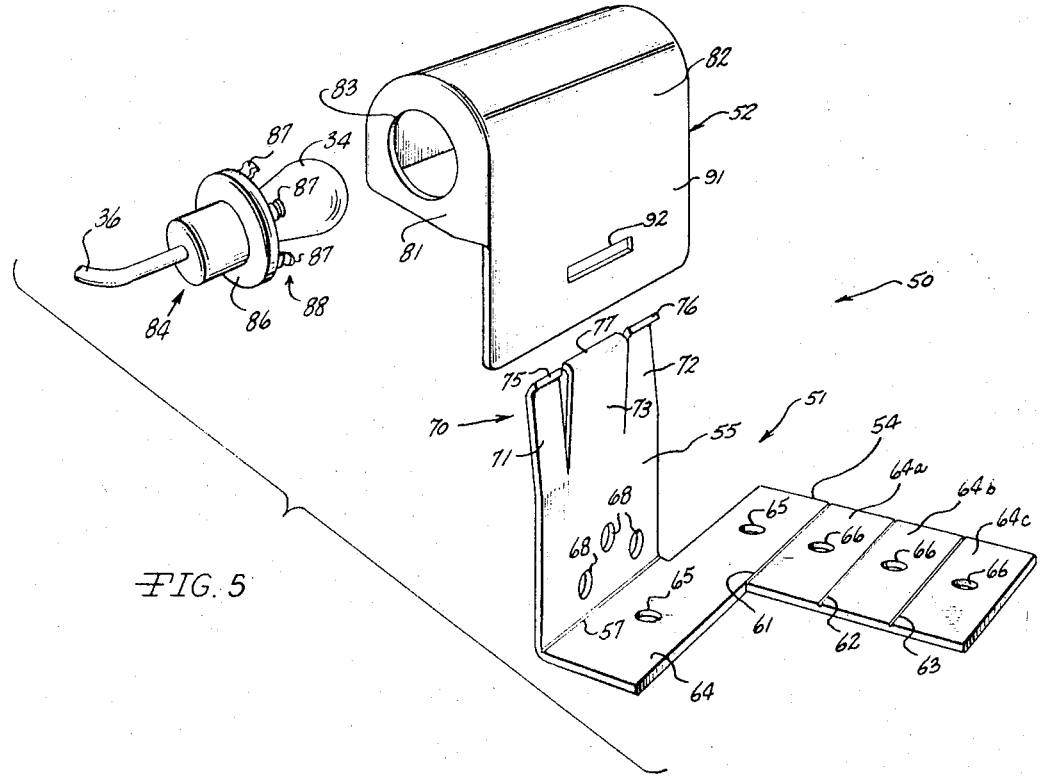
FIG. 5
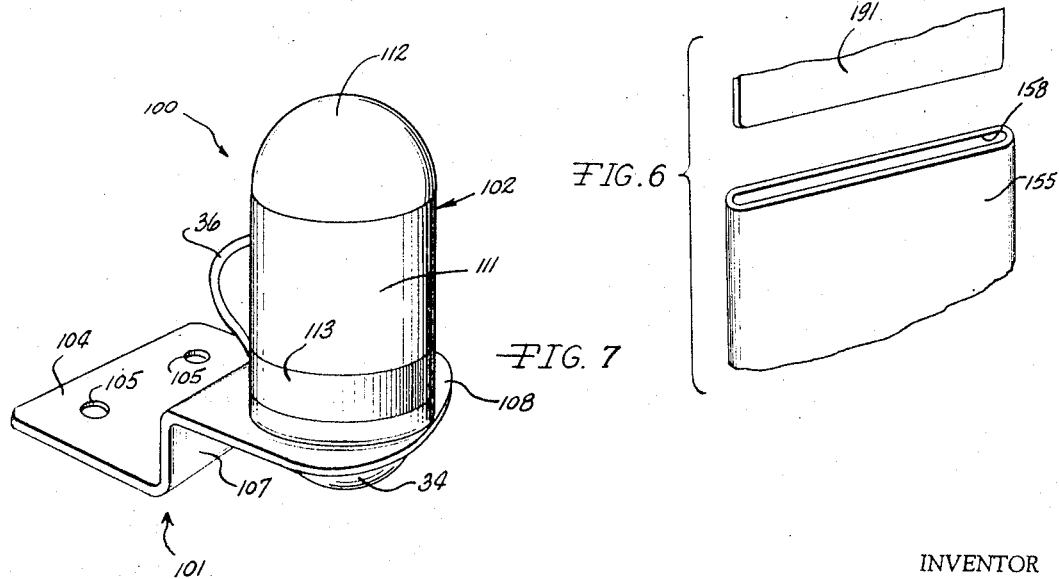
FIG. 6
FIG. 7
INVENTOR
PAUL S. SENSEMAN
BY Roy A. Plant
ATTORNEY

United States Patent Office 3,452,190
Patented June 24, 1969

3,452,190
ILLUMINATING DEVICE FOR VEHICLES
Paul S. Senseman, 11 W. Coolidge,
Battle Creek, Mich. 49017
Filed Dec. 27, 1965, Ser. No. 516,352
Int. Cl. B60q 3/02
U.S. Cl. 240—7.1                10 Claims

ABSTRACT OF THE DISCLOSURE

A bracket has a first flange for attachment to the bottom of an automobile door. A second flange extends perpendicularly upwardly from the first flange along the inner surface of the door. An illuminating device is supported on the upper end of the second flange and has a somewhat cylindrically shaped housing which is horizontally mounted. The rear end of the housing has a light transmitting plug such that when the door is open the light may be seen from cars approaching from the rear. The bottom of the housing is open so that the ground adjacent the door is illuminated when the door is open.

---

The number and variety of uses of automobiles have been continually increasing over the years. The age range of frequent users is also continually expanding. Many vehicles are used for hunting and fishing trips and other outdoor activities where the terrain is not conditioned for normal use or familiar to the user. Many users of automobiles of the elder age group enter and depart from the automobile in areas where the footing is conditioned, but has become defective or obstacles are present. Entering and leaving vehicles without sure footing can cause actual injury as well as problems from the apprehension of injury. Lighting the ground area so a person can see to secure proper footing is quite important. Many times a vehicle user must open the vehicle door on the traffic side of the vehicle, and a desirable function in addition to lighting the ground is to provide a visual indication to an approaching vehicle. This proves to be a great safety factor. An illumination means having a primary light source is of greater benefit than a light reflecting means.

It was a recognition of the above mentioned and other problems and difficulties and the need of an efficient and effective ground lighting and signal giving device which led to the conception and development of the present invention.

Summary of the invention

Accordingly, among the object of the present invention is the provision of a novel illuminating device which can be easily and inexpensively mounted on vehicle doors.

Another object of the present invention is to provide an illuminating device which can be mounted to a vehicle door to illuminate the ground area adjacent the door frame and provide an indicating light means for approaching vehicles.

A further object of the present invention is to provide an illuminating device where the cover member can easily be removed for either repair or exchange.

A still further object of the present invention is to provide a vehicle door lamp means for illuminating the ground area and having an escape means for the heated air warmed by the illuminating source.

A still further object of the present invention is to provide a lamp unit which can be mounted on a door on either side of the vehicle and having holes of substantially equal size on the side portions of its cover member to receive either a lamp mounting means or an illuminating plug member.

A still further object of the present invention is to provide an easily installed lamp accessory kit which can be installed on automotive vehicle doors after they have left their point of manufacture.

Still another object of the present invention is to provide a ground and indicator illuminating means which can be easily installed on a vehicle door and is positioned in a protective location when not in use.

Still further objects and advantages of the invention will appear as the description proceeds.

Brief description of the drawings

To the accomplishment of the foregoing and related ends, the invention, then, consists of a lamp unit assembly as hereinafter fully described and particularly pointed out in the claims, the annexed drawings and the following description setting forth in detail certain means for carrying out the invention, such disclosed means illustrating, however, but several of the various ways in which the principle of the invention may be used.

In the annexed drawings:

FIGURE 1 is a fragmentary perspective view of an automobile body assembly illustrating a lamp unit assembly of the present invention as it actually appears when installed on a vehicle door and with parts broken away and in partial section.

FIGURE 2 is an end view of the lamp unit assembly shown in FIGURE 1 illustrating the principles of the present invention.

FIGURE 3 is a front view of the lamp unit assembly disclosed in FIGURES 1 and 2.

FIGURE 4 is a front view similar to FIGURE 1 illustrating an alternate cover member for use with the lamp unit assembly.

FIGURE 5 is an expanded perspective view of an alternate lamp unit assembly illustrating a removable cover member and its mounting means which is within the spirit and scope of the provisions of the present invention.

FIGURE 6 is a partial perspective view illustrating an alternate mounting means for securing the cover member to a support flange for use in conjunction with an assembly as illustrated in FIGURE 5.

FIGURE 7 is a perspective view of an alternate lamp unit assembly illustrating the lamp axis in a vertical direction and incorporating the principles of the present invention.

Description of specific embodiments

Generally referring to FIGURES 1 through 3, there is provided a car assembly 10 having a body member 11 and a door frame 12. The car assembly 10 has a door 13 which is mounted to the door frame 12 by door hinges 14. The door frame 12 has a step member 18 and is provided with an on-off switch 15. In some cases an on-off switch 15 may not be provided on the automobile. In such cases it would be added, the purpose of which will be discussed in more detail below.

The door 13 has a bottom member 16 and a door panel covering 17. A lamp unit assembly 20 is mounted to the bottom member 16, this can be done in various manners well known in the art, in the present illustration the mounting is by securing screws 21. The lamp unit assembly 20 has a securing flange 22 through which the securing screws 21 pass, shown in FIGURE 2, and secure the lamp unit assembly 20 to the bottom member 16. In the preferred embodiment the lamp unit assembly 20 is mounted on bottom member 16 someplace on the half of door 13 away from door hinges 14. This permits the lamp unit assembly 20 to have a wide arc when the door 13 is being opened.

A support flange 23 is connected to and projects from the securing flange 22 in substantially a perpendicular direction. The support flange 23 has a cover member 25 connected at its upper end. The cover member 25 is made up with a top portion 26 and side portions 27 and 28 as viewed in FIGURES 2 and 3. An illuminating plug 31 is provided in side portion 27 and a lamp mounting 32 is provided in side portion 28 of the present illustration. The lamp mounting 32 can be made of various materials, but in some applications it may be desirable to have it made of a resilient material such as rubber. The illumination portion 31 could be made of various transparent or translucent materials such as colored plastic. The lamp unit assembly 20 is positioned so the cover member 25 is held above the bottom member 16. When the door 13 is moved to its closed position in the door frame 12 the lamp unit assembly 20 will pass over the step member 18. The cover member 25 of the lamp unit assembly 20 is positioned substantially near the level of the bottom member 16 and step member 18 so that the light rays of a lamp 34 will be affected as little as possible by the door 13. To increase the illumination effectiveness of the lamp 34, it is positioned partly below the lower edge of cover member 25, as viewed in FIGURES 2 and 3. The lamp 34 is able to illuminate the ground surface in a substantial area because the restriction of the light rays is held to a minimum.

An electrical wire 36 is connected to the lamp 34 and passes through lamp mounting 32. In the preferred embodiment wire 36 extends along the edge of door 13. The wire 36 can be secured in place by various means, in the present embodiment it is secured by clips 37. The clips 37 hold the electrical wire 36 out of sight between door panel covering 17 and door 13. The electrical wire 36 extends from the door 13 across to the door frame 12 making one loop as illustrated in FIGURE 1. The wire 36 passes into the door frame 12 through inlet mounting 35. The loop of wire 36 will be flush between door 13 and door frame 12 when door 13 is in its closed position. When the door 13 is opened the loop will tend to expand out in an unwinding or straightening manner. This allows the electrical wire 36 to have a long life and reduces to a minimum any time lost for breakdown or maintenance of the electrical wiring. The electrical wire can also pass through the door panel indicated in FIGURE 1 as electrical wire 36a. This embodiment for electrically connecting the lamp unit 20 to the electrical system of the car assembly 10 could have a tube member 38 connecting the door 13 and door frame 12 to an opening 39. The tube member 38 could be hinged to the body member 11 inside opening 39 in various manners well known in the art. The wire 36 or 36a will be electrically connected to the electrical system of the car assembly 10 which is controlled by the on-off switch 15. The switch 15 makes contact when the door 13 is open to permit electrical current to pass into lamp 34 and breaks contact preventing the passage of electrical current to lamp 34 when the door 13 is closed.

The side portions 27 and 28 are provided with holes to receive illumination plug 31 and lamp mounting 32. In a preferred embodiment these holes would be of substantially equal size. The illuminating plug 31 has a snap-in-place ring 41 which permits it to be snapped into the hole of either side portion 27 or 28. The lamp mounting 32 would also have a snap-in-place feature so that it could be positioned into the hole of either side portion 27 or 28. This arrangement allows for the lamp unit assembly 20 to be universal as it could be installed on either the left or right side door of a vehicle.

In the course of normal operation the door 13 of vehicles will be opened for only short periods of time; therefore, the heat generated from the lamp 34 will not be of any major consequence. Also, in the majority of applications the door will only be open when the vehicle is at rest or moving at a very slow speed, and no protective provision will be needed in usual useage for the lamp 34 when the door 13 is open. The lamp 34 will be protected by the cover member 25 and the automobile seat and floor when the door 13 is closed. FIGURE 4 illustrates an alternate embodiment of the cover member 25 with louvers 42. The louvers 42 allow air heated by lamp 34 to pass out through the top cover member 25. A protective grid member 43 is also provided over the lamp 34 to protect it from contact with foreign elements.

Referring to FIGURE 5, an alternate embodiment of the lamp unit assembly generally referred to as 50 is shown in an expanded illustration. The lamp unit assembly 50 has a base member 51 and a cover member 52. The base member 51 has a securing flange portion 54 and a support flange portion 55. The support flange portion 55 is connected to and extends from the securing flange portion 54 along a stamping score 57 in a substantially perpendicular direction. The securing flange portion 54 is separated into major section 64 and minor sections 64a, 64b and 64c by stamping scores 61, 62 and 63, respectively, the four sections are shown for illustrative purposes only. Stamping scores 57 and 61 help define major section 64 which has securing holes 65. The minor sections 64a, 64b and 64c of securing flange portion 54 have securing holes 66. The purposes of these securing holes and stamping scores will be explained in more detail below.

The support flange portion 54 has securing holes 68, forming a triangular pattern for illustrative purposes, adjacent stamping score 57. The upper end of flange support portion 55 is provided with a trifurcated end 70. The trifurcated end 70 has pressure leaves 71 and 72 and a locking leaf 73. Pressure leaves 71 and 72 are sprung to a resilient position out from the main body of support flange portion 55 and are provided with pressure tips 75 and 76, respectively. Locking leaf 73 is sprung to a resilient position out from the main body of support flange portion 55 in the opposite direction of pressure leaves 71 and 72 and is provided with a locking tip 77. The complete function of the trifurcated end 70 will be explained in more detail below. The cover member 52 has two side portions, with only side portion 81 shown in FIGURE 5, and a top portion 82. Side portion 81 has an inlet hole 83 to receive a bulb assembly 84. The electrical wire 36 enters lamp unit assembly 50 through lamp plug 86 for passing electrical current to lamp 34. Lamp plug 86 has a series of clip flanges 87 which form a snap-in-place ring 88 for securing the bulb assembly 84 to the cover member 52. The clip flanges 87 act on the inlet hole 83 to secure the bulb assembly 84 in position. A similar inlet hole will be provided on the side portion of cover member 52, the side portion not shown in FIGURE 5, in which an illumination plug 31 could be inserted when the lamp unit assembly 50 is to be positioned on the left side door of a vehicle. If the lamp unit assembly 50 is to be assembled on the right side door of a vehicle the bulb assembly 84 and the illumination plug 31 should be reversed. This reversing means makes the lamp unit assembly 50 universal for use on either side door of a vehicle, in a preferred embodiment.

When the lamp unit assembly 50 is to be installed on a vehicle the stamping scores 57, 61, 62, and 63 are useful for providing the installer with the opportunity of removing the major and minor sections 64, 64a, 64b and 64c of the securing flange portion 54 off from the lamp unit assembly 50 if they extend beyond the width of the door, thus preventing mounting of the lamp unit assembly. Securing screws 21 can be placed into securing holes 65 of major section 64, and additional securing screws 21 can be applied in one or more of the securing holes 66 of minor sections 64a, 64b and 64c giving a triangular effect in mounting lamp unit assembly 50 to door 13 if minor sections beyond major section 64 remain. If construction of the door section of the automobile is such that the lamp unit assembly 50 cannot be mounted to the bottom member 16 then the securing flange portion 54 can be removed as part of the base member 51 by bending it free from the support flange portion 55 along stamping score 57. The securing holes 68 on support flange portion 55 could receive securing screws 21 for mounting the lamp unit assembly 50 to the door panel cover 17.

The top portion 82 is provided with a lock flange 91 and a lock groove 92. To secure the cover member 52 in place the lock flange 91 passes between lock leaf 73 and pressure leaves 71 and 72 until lock tip 77 snaps into lock groove 92. The pressure tips 71 and 72 act on lock flange 91 and assist in holding lock tip 77 in securing contact with lock groove 92.

Base member 51 is so constructed that if it were made from a punch press operation a minimum amount of scrap material would be produced. In a press operation the base member 51 would be flat and the minor section 64a, 64b and 64c could lie next to the support flange portion 55 of the adjacent base member 51. This would permit the pieces to be made from strip stock of various lengths.

FIGURE 6 illustrates a mounting system having a lock flange 191 and a support flange portion 155 replacing lock flange 91 and support flange portion 55, respectively, of FIGURE 5. The support flange portion 155 is provided with a receiving pocket 158. The receiving pocket 158 receives the lock flange 191 in its upper end, the internal size of receiving pocket 158 decreases from its opening. This causes a wedging action on the locking flange 191 as it moves down into its mounting position in receiving pocket 158. In some applications lock flange 191 and support flange 155 will replace support flange portion 55 and lock flange 91, respectively, of FIGURE 5. An example of such an application is when the base member is a metal stamping and the cover member is a plastic casting.

Referring to FIGURE 7, lamp unit assembly 100 has a base member 101 and a cover member 102. The base member 101 has a securing flange portion 104 with securing holes 105. A support flange 107 as part of base member 101 is connected to the securing flange portion 104 in substantially a horizontal perpendicular direction. A cover support member 108 is connected to the support flange 107 and extends from it in the opposite direction and substantially parallel to securing flange portion 104. The cover member 102 has a body portion 111 which can be either a separate part or integral with cover support member 108. A top portion 112 receives the electrical wire 36 and covers the mounting apparatus for lamp 34. The body portion 111 has an illumination portion 113 extending around its lower portion to act as an indicator to approaching vehicles. The lamp 34 extends somewhat below the cover support member 108, thus having the benefit of providing more light rays to expose the ground portion which is desired to be illuminated.

It has been mentioned that an illumination plug could be furnished for positioning in one side portion or around the body portion of the lamp unit assembly to give a signal to approaching vehicles. In some applications the cover member of the lamp unit assembly may be made out of translucent plastic so that the cover member itself would act as an illumination means for signalling approaching vehicles making an illumination plug unnecessary.

It will be seen from the above that simple and inexpensive yet practical and durable means have been disclosed for obtaining the desired ends. Attention is again invited, however, to the possibility of making variations within the spirit and scope of the invention set forth. Therefore, the embodiments shown in the drawings and covered above are to be considered as merely set forth for illustrative purposes and are not intended to limit the scope of the invention herein described and shown.

Other modes of applying the principles of my present invention may be employed instead of those explained, change being made as regards the details described, provided the means stated by any of the following claims or the equivalent of such stated means be employed.

I therefore particularly point out and distinctly claim as my invention:

1. A lamp unit assembly for a vehicle door, comprising, in combination:
    (a) a securing flange connected to the bottom of said vehicle door,
    (b) a support flange connected to said securing flange in substantially a perpendicular relationship,
    (c) a cover member connected to said support flange above the bottom of said vehicle door and adjacent the inside surface of said vehicle door,
    (d) said cover member having a bottom opening,
    (e) an electrically powered lamp,
    (f) a lamp mounting means supporting said lamp in said cover member,
    (g) said lamp receiving electrical power when said vehicle door is open, and
    (h) said lamp passing light through said opening to light the ground area adjacent the bottom of said vehicle door.

2. A lamp unit assembly as defined in claim 1, wherein:
    (a) said cover member has a light transmitting illumination means, and
    (b) said lamp passes light through said illumination means to signal approaching vehicles.

3. A lamp unit assembly as defined in claim 2, wherein:
    (a) said cover member has a top portion and two side portions,
    (b) said side portions have inlet holes of substantially the same size,
    (c) said illumination means includes an illumination plug to be positioned in one of said inlet holes, and
    (d) said lamp mounting means to be positioned in the other of said inlet holes.

4. A lamp unit assembly as defined in claim 3, wherein:
    (a) said lamp extends below said bottom opening of said cover member.

5. A lamp unit assembly as defined in claim 4, wherein:
    (a) said cover member has louvers, and
    (b) a protective grid extends substantially over said bottom opening of said cover member.

6. A lamp unit assembly as defined in claim 1, wherein:
    (a) said cover member has a light transmitting illumination portion,
    (b) said cover member and said lamp mounting means hold said lamp in a vertical position, and
    (c) said lamp passes light through said illumination means when said vehicle door is open.

7. A lamp unit assembly for a vehicle door, comprising, in combination:
    (a) a base member,
    (b) said base member having an automobile door mounting means,
    (c) a cover member having a top portion and two side portions,
    (d) an electrically powered lamp,
    (e) a bulb assembly supporting said lamp in said cover member,
    (f) said cover member having a securing member,
    (g) said base member having a support means,
    (h) a bottom opening in said cover member, and
    (i) a locking member acting with said support means to hold said cover member in a mounted position.

8. A lamp unit assembly as defined in claim 7, wherein:
    (a) said support member has a locking leaf,
    (b) said locking means has a receiving pocket, and
    (c) said locking leaf has a tip which fits into said receiving pocket and is held in a wedge position to secure said cover member in its mounted position.

9. A lamp unit assembly for a vehicle door, comprising, in combination:
 (a) a base member,
 (b) said base member having a mounting means,
 (c) a cover member having a top portion and two side portions,
 (d) an electrically powered lamp,
 (e) a bulb assembly supporting said lamp in said cover member,
 (f) said cover member having a securing member,
 (g) said base member having support means,
 (h) a bottom opening in said cover member,
 (i) a locking member acting with said support means to hold said cover member in a mounted position,
 (j) said securing and support member combination has a lock flange and a lock groove,
 (k) said support means has a trifurcated end with a middle locking leaf having a locking tip and two pressure leaves having pressure tips,
 (l) said locking tip enters said lock groove of said lock flange from one side thereof for holding the cover member in its mounted position, and
 (m) said pressure tips act on the other side of said lock flange holding said locking tip in said lock groove.

10. A lamp unit assembly as defined in claim 9, wherein:
 (a) said cover member has a light transmitting illumination means, and
 (b) said lamp passes light through said illumination means and said bottom opening when said vehicle door is open.

References Cited

UNITED STATES PATENTS

| | | | |
|---|---|---|---|
| 2,289,471 | 7/1942 | Welter et al. | 240—4 |
| 2,612,599 | 9/1952 | Matson et al. | 240—4 XR |
| 3,114,509 | 12/1963 | Bustamante | 240—8.22 |
| 3,348,036 | 10/1967 | Bodian et al. | 240—47 |

FOREIGN PATENTS

| | | |
|---|---|---|
| 1,037,050 | 7/1966 | Great Britain. |
| 1,412,304 | 8/1965 | France. |
| 934,871 | 11/1955 | Germany. |

NORTON ANSHER, *Primary Examiner.*

M. H. HAYES, *Assistant Examiner.*

U.S. Cl. X.R.

240—47, 57